（12）United States Patent
Fujimoto

(10) Patent No.: US 8,852,704 B2
(45) Date of Patent: Oct. 7, 2014

(54) RESIN WELDED BODY AND METHOD FOR MANUFACTURING THE SAME

(71) Applicant: Seizo Fujimoto, Chiyoda-Ku (JP)

(72) Inventor: Seizo Fujimoto, Chiyoda-Ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/777,303

(22) Filed: Feb. 26, 2013

(65) Prior Publication Data

US 2014/0037914 A1    Feb. 6, 2014

(30) Foreign Application Priority Data

Aug. 1, 2012  (JP) ................................ 2012-170933

(51) Int. Cl.
*B32B 3/00*  (2006.01)
*B32B 7/04*  (2006.01)
*B29C 65/16*  (2006.01)
*B29C 65/00*  (2006.01)
*B29C 65/78*  (2006.01)
*B29C 35/08*  (2006.01)
*B29L 31/34*  (2006.01)

(52) U.S. Cl.
CPC .................. *B32B 7/045* (2013.01); *B29C 65/16* (2013.01); *B29C 65/00* (2013.01); *B29C 66/43* (2013.01); *B29C 2035/0838* (2013.01); *B29C 66/1122* (2013.01); *B29L 2031/3481* (2013.01); *B29C 65/1635* (2013.01); *B29C 65/1654* (2013.01); *B29C 65/7829* (2013.01); *B29C 66/112* (2013.01); *B29C 66/114* (2013.01); *B29C 66/24221* (2013.01); *B29C 66/322* (2013.01); *B29C 66/55* (2013.01); *B29C 66/542* (2013.01)
USPC ................... 428/53; 428/57; 428/58; 428/60; 428/192; 264/482; 156/270; 156/272.8; 156/379.8

(58) Field of Classification Search
CPC .... B29C 65/00; B29C 65/1635; B29C 66/43; B29C 66/1122; B29C 66/1142; B32B 3/06; B32B 3/02; B32B 7/12
USPC .................. 428/53, 57, 58, 60, 192; 264/482; 156/270, 272.8, 379.8
See application file for complete search history.

(56) References Cited

U.S. PATENT DOCUMENTS 7,862,874 B2 *  1/2011  Asada et al. ..................... 428/60
8,597,755 B2 * 12/2013  Fujimoto et al. ................ 428/57

(Continued)

FOREIGN PATENT DOCUMENTS

JP        2000-218699 A    8/2000
JP        2008-260161 A   10/2008

(Continued)

OTHER PUBLICATIONS

Japanese Office Action issued Apr. 22, 2014, Patent Application No. 2012-170933.

*Primary Examiner* — Betelhem Shewareged
(74) *Attorney, Agent, or Firm* — Sughrue Mion, PLLC

(57) ABSTRACT

A X-Y plane is a plane parallel to abutting surfaces on which a joining portion is formed, and a Z direction is a direction perpendicular to the X-Y plane. A sealing member is held between the outer circumference side of a guide provided on a lid body and the inner circumference side of a rib provided on a case, and is pressed in a direction parallel to the X-Y plane. Laser light is scanned on the inner circumference side with respect to a ring-shaped pressurization jig with a stopper pressurized by the pressurization jig, so the pressurization jig does not break the path of the laser light. This expands the range of options in the material for the pressurization jig, which enables an easy-maintenance jig to be used, improving productivity.

9 Claims, 2 Drawing Sheets

(56) References Cited

U.S. PATENT DOCUMENTS

2008/0254242 A1 10/2008 Asada et al.
2008/0261065 A1 10/2008 Fujimoto et al.
2014/0037914 A1* 2/2014 Fujimoto ................... 428/198

FOREIGN PATENT DOCUMENTS

JP 2008-265163 A 11/2008
JP 4531074 B2 8/2010

* cited by examiner

US 8,852,704 B2

RESIN WELDED BODY AND METHOD FOR MANUFACTURING THE SAME

BACKGROUND OF THE INVENTION

1. Field of the Invention

The present invention relates to a resin welded body in which a resin part that transmits laser light with a predetermined wavelength and a resin part that absorbs laser light with the same wavelength are joined by welding using the laser light.

2. Description of the Related Art

Conventionally, a laser light welding method is used for manufacturing a resin welded body. The laser light welding method is briefly described below. First, a portion of a first resin part that transmits laser light with a predetermined wavelength is caused to abut a portion of a second resin part that absorbs laser light with the same wavelength. Then, the laser light is applied to the abutting surfaces from the first resin part side. Then, the laser light transmits the first resin part and is absorbed at around the surface of the second resin part. The energy of the absorbed laser light is converted to heat that heats the surface of the second resin part. This forms a melted portion on the abutting surfaces of the first resin part and the second resin part to be welded.

In this welding process, the surface adhesion property of the abutting surfaces, which will be a joining portion, of the both resin parts is a key. When the surface adhesion property is insufficient, the heat transfer from the second resin part to the first resin part becomes insufficient, leading to joining failure. Thus, in order to improve the surface adhesion property between the both resin parts, the laser light is applied with the abutting surfaces pressurized from the outside to be abutted. Note that, when the resin welded body is a closed container, a ring-shaped sealing member is placed on the inner side of a joining portion that is formed in a circumferential shape.

On the other hand, in the melted portion, melting progresses unless application of the laser light is stopped or pressurization from the outside is stopped. As a result of the progress of melting, the clearance between the both resin parts is reduced due to the sinking of the joining portion. In order to precisely manage the amount of sinking of the joining portion, Patent Document 1 discloses that a stopper (protrusion) is provided on one of the both resin parts to limit the amount of sinking of the joining portion.

According to the Patent Document 1, all of the joining portion, stopper and sealing member are placed in a circumferential shape, and the interference (squeeze) of the sealing member is determined based on the amount of sinking limited by the stopper. Furthermore, the joining portion, stopper and sealing member are placed in this order from the outer circumference side, which allows the interference of the sealing member to be determined only from the dimension of the stopper even when bending occurs in the joining portion due to variation in melting condition, maintaining stable sealing capability.

[Patent Document 1] JP-B-4531074

According to the Patent Document 1, a key for achieving precise dimensional management is to cause the stopper to reliably abut an opposite resin part. On the other hand, surface pressure obtained by compressing the sealing member generates a reaction force in the direction of preventing the both resin parts from abutting each other. So, in order to cause the stopper to reliably abut the opposite surface, an area to be pressurized needs to be on the inner circumference side with respect to the stopper.

However, when the laser light is applied to the joining portion along the circumference, if the area to be pressurized is set to the inner circumference side with respect to the laser light path, a pressurization jig or a part for supporting the jig may break the laser light path. Because of this, the pressurization jig needs to be made of a material that does not absorb the laser light (e.g. glass). However, even a glass jig may pose a problem that reduces laser energy due to reflection.

Furthermore, adhesion foreign matter to the glass jig or clouding of the glass jig due to gas generated from melted resin may also contribute to reduction in laser energy. This requires frequent maintenance of the glass jig, which reduces productivity.

SUMMARY OF THE INVENTION

In view of the above problem, it is an object of the present invention to provide a resin welded body that can provide stable sealing capability and enable highly precise dimensional management while facilitating manufacturing to improve productivity.

Furthermore, it is an object of the invention to provide a method for manufacturing a resin welded body for which an easy-maintenance pressurization jig can be used, to improve productivity.

A resin welded body in accordance with the invention is a resin welded body in which a first resin part and a second resin part are placed opposite to each other with a predetermined clearance therebetween and form a closed space therebetween, at least part of abutting surfaces of the first and second resin parts being joined by welding, the resin welded body including, when a X-Y plane is a plane parallel to the abutting surfaces and a Z direction is a direction perpendicular to the X-Y plane: a first protrusion in a circumferential shape that is provided on any one of the first and second resin parts and that protrudes in the Z direction in the closed space; a second protrusion in a circumferential shape that is provided on the resin part opposite to the resin part on which the first protrusion is provided and that protrudes in the Z direction on the outer circumference side with respect to the first protrusion; a third protrusion that is provided on any one of the first and second resin parts and that protrudes in the Z direction on the outer circumference side with respect to the second protrusion and abuts the opposite resin part to define the clearance between the first and second resin parts; and a ring-shaped sealing member that is held between the outer circumference side of the first protrusion and the inner circumference side of the second protrusion and that is pressed in a direction parallel to the X-Y plane.

Furthermore, a method for manufacturing a resin welded body in accordance with the invention includes: placing a first resin part that transmits laser light with a predetermined wavelength and a second resin part that absorbs laser light with the same wavelength opposite to each other; and applying the laser light from the first resin part side to join by welding at least part of abutting surfaces of the first and second resin parts, wherein, when a X-Y plane is a plane parallel to the abutting surfaces and a Z direction is a direction perpendicular to the X-Y plane: a first protrusion in a circumferential shape is provided on any one of the first and second resin parts, and protrudes in the Z direction in the closed space; a second protrusion in a circumferential shape is provided on the resin part opposite to the resin part on which the first protrusion is provided, and protrudes in the Z direction on the outer circumference side with respect to the first protrusion; a third protrusion is provided on any one of the first and second resin parts, and protrudes in the Z direction on the outer circumference side with respect to the second protrusion and abuts the opposite resin part to define the clearance between the first and second resin parts; the first and second resin parts are fitted to each other with a ring-shaped sealing member held between the outer circumference side of the first protrusion and the inner circumference side of the second protrusion; and the third protrusion is pressurized in the Z direction by a pressurization means positioned on the first resin part side and the laser light is applied on the inner circumference side with respect to the third protrusion to form a joining portion.

According to the invention, the ring-shaped sealing member is held between the outer circumference side of the first protrusion and the inner circumference side of the second protrusion, and is pressed in a direction parallel to the X-Y plane, so the surface pressure of the sealing member does not serve as reaction force against the pressurization in welding. This can provide stable sealing capability and enable highly precise dimensional management while facilitating manufacturing to improve productivity of the resin welded body.

Furthermore, according to the method for manufacturing a resin welded body in accordance with the invention, the joining portion is formed on the inner circumference side with respect to the third protrusion with the third protrusion pressurized by the pressurization means, so the pressurization means does not break the path of the laser light. This expands the range of options in the material for the pressurization means, which enables an easy-maintenance pressurization jig to be used, improving productivity.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
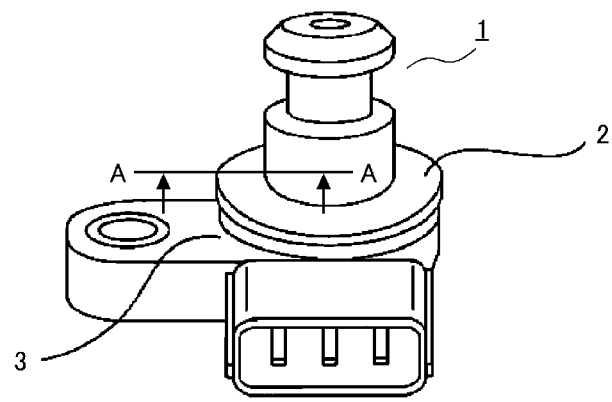
FIG. 1 is a perspective view showing an appearance of a resin welded body in accordance with a first embodiment of the invention.
Figure 2:
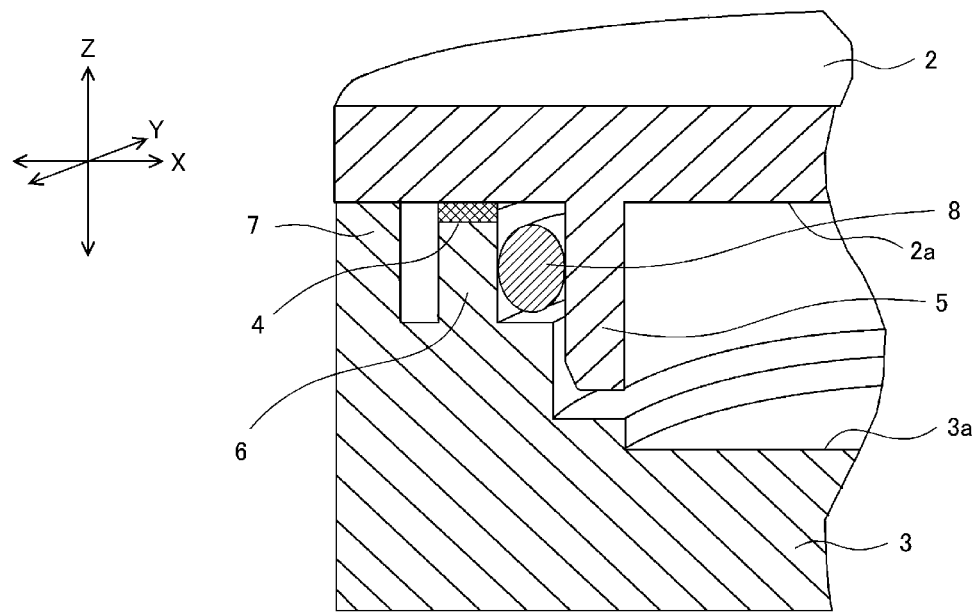
FIG. 2 is a partial cross-sectional view showing the resin welded body in accordance with the first embodiment of the invention.

A resin welded body and a method for manufacturing the same in accordance with a first embodiment of the invention is described below with reference to the drawings. FIG. 1 is a perspective view showing an appearance of a resin welded body in accordance with the first embodiment. FIG. 2 is a partial cross-sectional view along the line A-A in FIG. 1. Note that like components are represented by like numerals through the drawings. The first embodiment is described taking a closed container 1 of a pressure sensor as an example of the resin welded body.

The closed container 1 includes a lid body 2 that is a first resin part and a bottomed cylindrical case 3 that is a second resin part. The lid body 2 transmits laser light with a predetermined wavelength. The case 3 absorbs laser light with the same wavelength. The lid body 2 and the case 3 are placed opposite to each other with a predetermined clearance therebetween and form a closed space therebetween.

The structure around the joining portion of the closed container 1 in accordance with the first embodiment is described with reference to FIG. 2. Note that, in the following description, as shown in FIG. 2, a X-Y plane is a plane parallel to abutting surfaces on which a joining portion 4 is formed, and a Z direction is a direction perpendicular to the X-Y plane, i.e., a direction along which the lid body 2 and the case 3 are opposite to each other.

In a closed space sandwiched between an inner surface 2a of the lid body 2 and an inner surface 3a of the case 3, the lid body 2 has a guide 5 that is a first protrusion in a circumferential shape protruding in the Z direction. The guide 5 serves as a positioning guide used for placing the lid body 2 and the case 3 opposite to each other.

The case 3 has a rib 6 that is a second protrusion in a circumferential shape protruding in the Z direction on the outer circumference side with respect to the guide 5. Furthermore, the case 3 has a stopper 7 that is a third protrusion protruding in the Z direction on the outer circumference side with respect to the rib 6 and abuts the lid body 2. When the lid body 2 is weld to the rib 6, the stopper 7 limits the amount by which the lid body 2 sinks into the case 3 due to pressurization from the lid body 2 side, to define the clearance between the lid body 2 and the case 3.

The stopper 7 is provided on the outer circumference side with respect to the joining portion 4 joined by welding. In the first embodiment, the rib 6 abuts the opposite lid body 2, forming the abutting surfaces that is the joining portion 4. Note that the whole of the abutting surfaces may be welded into the joining portion 4 or at least part of the abutting surfaces may be welded into the joining portion 4.

A ring-shaped elastic sealing member 8 is held between the outer circumference side of the guide 5 and the inner circumference side of the rib 6. The sealing member 8 is, for example, an O-ring. The sealing member 8 is pressed in a direction parallel to the X-Y plane to ensure tight seal of the closed space. Note that the guide 5 and the rib 6 holding the sealing member 8 therebetween are both provided in a circumferential shape to maintain highly tight seal. The stopper 7 may be provided in a circumferential shape or may be partially provided.

Note that, in the first embodiment, as shown in FIG. 2, the guide 5 that is the first protrusion is provided on the lid body 2, and the rib 6 that is the second protrusion is provided on the case 3, but the invention is not limited to this. The first protrusion may be provided on any one of the first and second resin parts. The second protrusion is provided on the resin part opposite to the resin part on which the first protrusion is provided. The stopper 7 that is the third protrusion may also be provided on any one of the first and second resin parts.

Figure 3:
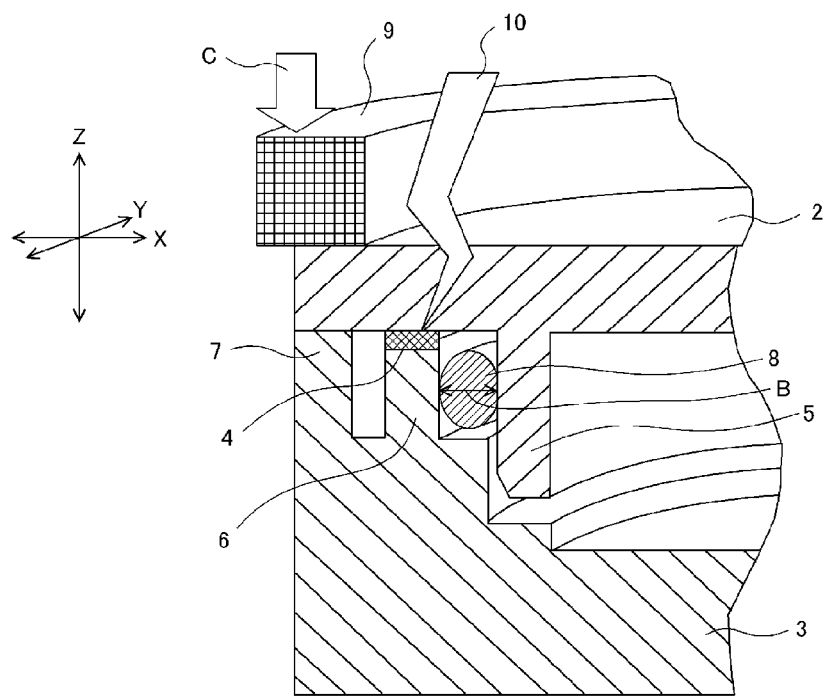
FIG. 3 is a partial cross-sectional view showing a welding process of the resin welded body in accordance with the first embodiment of the invention.

Next, the manufacturing method (welding process) of the closed container 1 in accordance with the first embodiment is described with reference to FIG. 3. FIG. 3 shows a relation between an area to be pressurized and an area to be irradiated with laser light in joining by welding using laser light. Note that, in FIG. 3, components like those in FIG. 2 are represented by like numerals.

First, the lid body 2 is fit into the case 3 with the ring-shaped sealing member 8 held between the outer circumference side of the guide 5 provided on the lid body 2 and the inner circumference side of the rib 6 provided on the case 3. At this time, the lid body 2 is pressed into the case 3 until the surface of the lid body 2 opposite to the case 3 abuts the rib 6. The sealing member 8 is pressed in a direction parallel to the X-Y plane, as indicated by an arrow B in FIG. 3.

Then, as indicated by an arrow C in FIG. 3, the stopper 7 is pressurized in the Z direction using a ring-shaped pressurization jig 9 that is a pressurization means positioned on the lid body 2 side, and laser light 10 is applied. The pressurization jig 9 is pressurized via a holder (not shown) provided on the outer circumference side of the jig 9. This pressurization causes the stopper 7 to abut the lid body 2 and causes the rib 6 to abut the lid body 2, improving the surface adhesion property of the abutting surfaces.

The laser light 10 is scanned on the inner circumference side of the pressurization jig 9 and applied to the abutting surfaces of the rib 6 and the lid body 2. The laser light 10 passes through the lid body 2 and is absorbed at the surface of the rib 6 to be converted to heat that causes the joining portion 4 to be melted. When the application of the laser light 10 is stopped, the joining portion 4 resolidifies to complete welding in the joining portion 4. In this way, the joining portion 4 is formed on the inner circumference side with respect to the stopper 7.

When the joining portion 4 melts, the lid body 2 sinks into the case 3 due to pressurization. However, the amount of sinking is limited by the stopper 7. This defines the clearance between the lid body 2 and the case 3 as a predetermined value. Note that the pressurization jig 9 is not limited to be ring-shaped, but may be one that pressurizes a portion of the stopper 7.

As described above, in the first embodiment, the lid body 2 and the case 3 are placed opposite to each other with a predetermined clearance therebetween and form the closed space therebetween; the guide 5, rib 6 and stopper 7 are provided in this order from the inner circumference side on the opposite surfaces of the lid body 2 and the case 3; and the ring-shaped sealing member 8 is held between the outer circumference side of the guide 5 and the inner circumference side of the rib 6. Furthermore, the joining portion 4 is provided on the rib 6 on the inner circumference side with respect to the stopper 7.

Thus, the sealing member 8 is pressed in a direction parallel to the X-Y plane to ensure tight seal in the closed container 1. Furthermore, the surface pressure of the sealing member 8 does not serve as reaction force against the pressurization in welding, so welding can be performed with the stopper 7 reliably abutting the lid body 2, allowing the amount of sinking of the joining portion 4 to be high-precisely managed. As seen from the above, the closed container 1 in accordance with the first embodiment can provide stable sealing capability and enable highly precise dimensional management.

Furthermore, according to the manufacturing method in accordance with the first embodiment, the laser light 10 is scanned on the inner circumference side with respect to the pressurization jig 9 with the stopper 7 pressurized by the pressurization jig 9, to form the joining portion 4, so the pressurization jig 9 does not break the path of the laser light 10. Thus, a jig made of a material that transmits laser light, such as a conventional jig made of glass, does not need to be used. This expands the range of options in the material for the pressurization jig 9, enabling an easy-maintenance jig to be used. This simplifies the maintenance of the pressurization jig 9, facilitating manufacturing to improve productivity.

Second Embodiment

Figure 4:
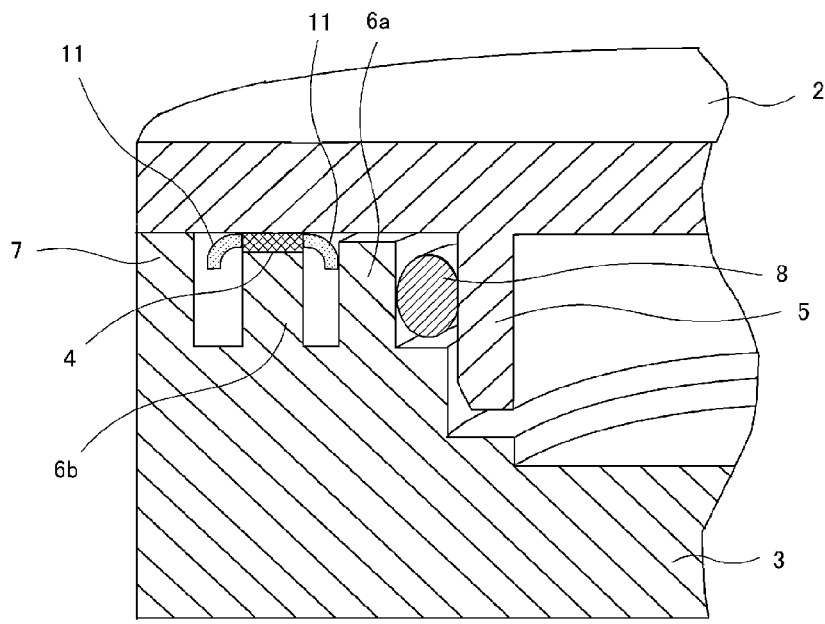
FIG. 4 is a partial cross-sectional view showing the resin welded body in accordance with a second embodiment of the invention.

A closed container that is a resin welded body in accordance with a second embodiment of the invention has an appearance similar to that of the first embodiment (see FIG. 1). FIG. 4 shows the structure around the joining portion of the closed container in accordance with the second embodiment. Note that, in FIG. 4, components like those in FIG. 2 are represented by like numerals.

In the first embodiment, as shown in FIG. 2, the rib 6 that is the second protrusion provided on the case 3 has two roles. One role is to hold the sealing member 8 between the rib 6 and the guide 5. The other role is to provide the abutting surfaces on which the joining portion 4 is formed. In the second embodiment, a sealing rib 6a and a joining rib 6b are provided to have the two roles, respectively. The structure except the ribs 6a and 6b is similar to that of the first embodiment and thus is not described here.

As shown in FIG. 4, the case 3 has the sealing rib 6a that is the second protrusion and the joining rib 6b that is a fourth protrusion. The joining rib 6b protrudes in the Z direction and abuts the lid body 2 on the outer circumference side with respect to the sealing rib 6a and on the inner circumference side with respect to the stopper 7 that is the third protrusion. At least a part of the abutting surfaces are joined by welding to form the joining portion 4.

An advantage of separately providing the sealing rib 6a and the joining rib 6b in the second embodiment is described. First, since the laser light is not applied to the sealing rib 6a, the sealing member 8 will not be affected by the laser light (e.g., will not be deformed by heat), which can maintain stable sealing surface.

Furthermore, even when the amount of resin 11 melted and ejected by the laser light is more than normal, the resin 11 does not invade the space in which the sealing member 8 is placed. In other words, the ejected resin 11 does not interfere with the sealing member 8 to degrade the sealing capability. Thus, when the abutting surfaces of the joining rib 6b and the lid body 2 have a poor adhesion property, as a preliminary process before welding that is a main process, laser light can be applied to the surface of the joining rib 6b to melt projections and smooth the surface, improving the adhesion property of the abutting surfaces.

Note that, in the second embodiment, the sealing rib 6a is provided in a circumferential shape, but the joining rib 6b may be provided in a circumferential shape or may be partially provided. In terms of joining strength, it may be advantageous to provide the joining rib 6b in a circumferential shape. But, in terms of reducing energy for applying laser light, a smaller area of the joining portion 4 may be advantageous.

As described above, also in the second embodiment as in the first embodiment, the closed container 1 can be obtained that can provide stable sealing capability and enable highly precise dimensional management. Furthermore, in the second embodiment, a manufacturing method similar to that of the first embodiment can be used, which simplifies the maintenance of a pressurization jig, facilitating manufacturing to improve productivity. The invention may be embodied in any combination of the embodiments or in a form in which any of the embodiments is appropriately varied or omitted without departing from the scope of the invention.

Various modification and alterations of this invention will be apparent to those skilled in the art without departing from the scope and spirit of this invention, and it should be understood that this is not limited to the illustrative embodiment set forth herein.

What is claimed is:

1. A resin welded body in which a first resin part and a second resin part are placed opposite to each other with a predetermined clearance therebetween and form a closed space therebetween, at least part of abutting surfaces of the first and second resin parts being joined by welding, the resin welded body comprising, when a X-Y plane is a plane parallel to the abutting surfaces and a Z direction is a direction perpendicular to the X-Y plane:
- a first protrusion in a circumferential shape that is provided on any one of the first and second resin parts and that protrudes in the Z direction in the closed space;
- a second protrusion in a circumferential shape that is provided on the resin part opposite to the resin part on which the first protrusion is provided and that protrudes in the Z direction on the outer circumference side with respect to the first protrusion;
- a third protrusion that is provided on any one of the first and second resin parts and that protrudes in the Z direction on the outer circumference side with respect to the second protrusion and abuts the opposite resin part to define the clearance between the first and second resin parts; and
- a ring-shaped sealing member that is held between the outer circumference side of the first protrusion and the inner circumference side of the second protrusion and that is pressed in a direction parallel to the X-Y plane.

2. The resin welded body according to claim 1, wherein the first resin part transmits laser light with a predetermined wavelength and the second resin part absorbs laser light with the same wavelength.

3. The resin welded body according to claim 1, wherein the first protrusion serves as a positioning guide used for placing the first resin part and the second resin part opposite to each other.

4. The resin welded body according to claim 1, wherein the third protrusion is provided on the outer circumference side with respect to a joining portion joined by welding.

5. The resin welded body according to claim 4, wherein the second protrusion is provided on the second resin part and abuts to the first resin part, and at least part of the abutting surfaces are joined by welding into the joining portion.

6. The resin welded body according to claim 4, wherein the second resin part protrudes in the Z direction on the outer circumference side with respect to the second protrusion and on the inner circumference side with respect to the third protrusion and comprises a fourth protrusion abutting the first resin part, and at least part of the abutting surfaces are joined by welding into the joining portion.

7. The resin welded body according to claim 1, wherein the sealing member is an O-ring.

8. A method for manufacturing a resin welded body comprising: placing a first resin part that transmits laser light with a predetermined wavelength and a second resin part that absorbs laser light with the same wavelength opposite to each other to form a closed space therebetween; and applying the laser light from the first resin part side to join by welding at least part of abutting surfaces of the first and second resin parts, wherein, when a X-Y plane is a plane parallel to the abutting surfaces and a Z direction is a direction perpendicular to the X-Y plane:
- a first protrusion in a circumferential shape is provided on any one of the first and second resin parts and protrudes in the Z direction in the closed space; a second protrusion in a circumferential shape is provided on the resin part opposite to the resin part on which the first protrusion is provided, and protrudes in the Z direction on the outer circumference side with respect to the first protrusion; a third protrusion is provided on any one of the first and second resin parts, and protrudes in the Z direction on the outer circumference side with respect to the second protrusion and abuts the opposite resin part to define the clearance between the first and second resin parts;
- the first and second resin parts are fitted to each other with a ring-shaped sealing member held between the outer circumference side of the first protrusion and the inner circumference side of the second protrusion; and the third protrusion is pressurized in the Z direction by a pressurization means positioned on the first resin part side and the laser light is applied on the inner circumference side with respect to the third protrusion to form a joining portion.

9. The method for manufacturing a resin welded body according to claim 8, wherein the pressurization means is a ring-shaped jig, and the laser light is scanned on the inner circumference side of the jig.

* * * * *